US 6,355,771 B1
Mar. 12, 2002

(12) United States Patent
Oda

(54) MODIFIED POLYASPARTIC ACID, METHOD FOR PRODUCTION THEREOF AND USE THEREOF

(75) Inventor: Yoshihisa Oda, Matsudo (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/371,736

(22) Filed: Aug. 10, 1999

(30) Foreign Application Priority Data

Aug. 10, 1998 (JP) .............................. 10-226334

(51) Int. Cl.⁷ ..................... C08G 69/00; C08G 73/10; G02F 5/00
(52) U.S. Cl. .................. 528/328; 528/360; 528/363; 528/373; 528/374; 528/332; 525/418; 525/420; 252/175
(58) Field of Search ................. 528/328, 332, 528/360, 363, 373, 374; 525/418, 420; 252/175

(56) References Cited

U.S. PATENT DOCUMENTS

| 4,363,797 A | | 12/1982 | Jacque et al. ................. 424/70 |
| 5,152,902 A | * | 10/1992 | Koskan et al. ............... 252/180 |
| 5,288,783 A | * | 2/1994 | Wood .......................... 528/363 |
| 5,527,863 A | * | 6/1996 | Wood et al. ................. 525/432 |
| 5,543,491 A | * | 8/1996 | Wood et al. ................. 528/328 |
| 5,571,889 A | * | 11/1996 | Katoh et al. ................ 528/328 |
| 5,876,623 A | * | 3/1999 | Tang et al. .................. 252/180 |

FOREIGN PATENT DOCUMENTS

| DE | 195 41 699 A1 | 5/1997 | ........... C08G/69/10 |
| EP | 0 866 084 A2 | 9/1998 | ........... C08G/69/10 |
| JP | A-6-248072 | 9/1994 | ........... C08G/69/10 |

* cited by examiner

*Primary Examiner*—P. Hampton-Hightower
(74) *Attorney, Agent, or Firm*—Fish & Richardson P.C.

(57) ABSTRACT

A modified polyaspartic acid having a defined branched structure in the main chain thereof is provided. An anhydro polyaspartic acid is modified by a novel method of modification using a mercapto amine precursor, mercapto amine, or a salt of mercapto amine, using a mercapto amine precursor, mercapto amine, or a salt of mercapto amine and aspartic acid or a salt of aspartic acid as a modifying agent, and using no reaction solvent.

21 Claims, No Drawings

MODIFIED POLYASPARTIC ACID, METHOD FOR PRODUCTION THEREOF AND USE THEREOF

BACKGROUND OF THE INVENTION

1. Field of the Invention

This invention relates to a modified polyaspartic acid, a method for the production thereof, and a metal corrosion inhibitor and a scale formation inhibitor which use the modified polyaspartic acid.

2. Description of the Related Art

Generally when a metal is used in an environment inhabited by water, such problems as the formation of scale and the corrosion of metal arise frequently.

Natural water contains calcium ions and magnesium ions in the form of dissolved hydrogen carbonates. These salts, when heated, give rise to scale which forms the cause for damage to a boiler, for example. In recent years, the practice of injecting sea water into an oil field has been in vogue for the purpose of increasing the production of crude oil. In this case, the scale which has carbonates and sulfates of alkaline earth metals such as calcium, strontium and barium as main components is formed by the mixture of oil field brine and sea water. The scale possibly poses the problem of blocking the oil well pipes. The scale inhibitor is used, depending on the situation, for the purpose of coping with these problems. The observance of the prevention of scale formation is important in the field of industrial production.

The corrosion of metal, which is another problem herein, is a very serious matter in the management of various facilities and devices which handle aqueous media. To this problem, generally the metal corrosion inhibitor is applied.

The mode of using the scale inhibitor and the metal corrosion inhibitor is known in two forms, i.e. the closed system and the open system. The feature of these inhibitors in the open system is important because it has direct bearing on conservation of the environment. As one example of the use of the scale inhibitor or metal corrosion inhibitor in the open system, it is cited the protection of oil well pipes in the extraction of crude oil. The scale inhibitor and the metal corrosion inhibitor are dissolved in water (sea water) and the water is injected by the water flooding method. The mixture of the oil field brine and the injected water (sea water) is discarded after the separation of the crude oil. In consequence of the growth of consciousness of the environmental protection in recent years, the desirability of ensuring safety of the scale inhibitor and the metal corrosion inhibitor and decreasing their load on the environment have come to compel enthusiastic recognition.

Among the chemical substances that are expected or used as the scale inhibitor and the metal corrosion inhibitor, is counted polyaspartic acid. The polyaspartic acid is regarded as one of the biodegradable materials. It is the polymer of aspartic acid that is one species of amino acid. This polymer discharges the function of preventing scale formation and inhibiting metal corrosion.

SUMMARY OF THE INVENTION

The polyaspartic acid is a hopeful biodegradable material and a useful scale inhibitor. It, however, shows poor activity in the prevention of metal corrosion. If it is enabled to enhance the activity thereof in the prevention of metal corrosion, it will further gain in usefulness. Besides this merit, the enhanced activity enjoys a decrease in the application rate and in the load on the environment and, therefore, proves advantageous from the viewpoint of the conservation of environment.

Heretofore, none of the cysteamine modified polyaspartic acids has a branched chain structure in the art (U.S. Pat. No. 4,363,797 and JP-A-6-248072). I have pursued an elaborate study with a view to imparting further advanced functionality to cysteamine modified polyaspartic acids. As a result, I have developed a method for the synthesis of novel cysteamine modified polyaspartic acids, such as those having a branched chain structure and those having numerous branched chain structures formed of one aspartic acid residue. I have discovered that these cysteamine modified polyaspartic acids exhibit a great ability to prevent metal corrosion and inhibit scale formation. The present invention has been perfected as a result. The term "branched chain structure" as used herein is meant to describe the fact that a polyaspartic acid has in the main chain thereof a side chain formed of at least one aspartic residue.

The cysteamine modified polyaspartic acids of this invention are clearly distinct from the conventional cysteamine modified polyaspartic acids devoid of a branched chain (branched chain structure) even in terms of physical constants such as the metal ion bonding force which are related to the molecular structure.

I have carried out an elaborate study in search of a method for the synthesis of modified polyaspartic acids. As a result, I have discovered a commercially practicable method for the synthesis of modified polyaspartic acids that fulfills the task mentioned above.

In accorrdance with the first aspect of this invention, it provides a modified polyaspartic acid characterized by containing a partial structure represented by the formula I:

at a molar ratio (I) in the range of not less than 1 to not more than 99, and at least one branched chain structure selected from the group consisting of the formulas II and III at a molar ratio (I) of not less than 1 to not more than 49:

wherein the term "molar ratio (I)" used herein means the ratio based on the number of moles (100) of a total aspartic residue of a polyaspartic acid, and Asp denotes an aspartic residue, n an integer of not less than 1 to not more than 25, and m an integer of not less than 2 to not more than 2n, M and M' independently denote a hydrogen atom, an ammonium, or a metal, and (Asp)p denotes a branched chain.

In accordance with the second aspect of this invention, it provides a method for the production of a modified polyaspartic acid, characterized by comprising a step of adding a mercapto amine precursor, a mercapto amine, or a salt of mercapto amine to an anhydro polyaspartic acid and then allowing them to react with each other, wherein the term "mercapto amine" means $HSC_nH_mNH_2$, n denoting an integer of not less than 1 to not more than 25 and m an integer of not less than 2 and not more than 2n.

In accordance with the third aspect of this invention, it provides a metal corrosion inhibitor incorporating therein the modified polyaspartic acid mentioned above.

In accordance with the fourth aspect of this invention, it provides a scale formation inhibitor incorporating therein the modified polyaspartic acid mentioned above.

The modified polyaspartic acid of this invention has a high metal ion bonding force owing to the characteristic of molecular structure thereof and, as a result, exhibits a higher ability as a scale formation inhibitor and a metal corrosion inhibitor than the conventional polyaspartic acids. Thus, it is expected to find utility as such inhibitors.

The objects, features, and advantages of this invention other than those set forth above will become clear from the following description of the preferred embodiments.

DESCRIPTION OF THE PREFERRED EMBODIMENTS

The term modified polyaspartic acid used herein also includes salts of modified polyaspartic acid. Counterions for modified polyaspartic acid include, but are not limited to, the alkaline and alkaline earth cations, some example of which are $Na^+$, $K^+$, $Mg^{++}$, $Ca^{++}$, $Sr^{++}$, and $NH_4^+$.

This invention concerns a modified polyaspartic acid containing a partial structure represented by the formula I:

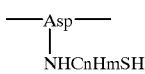

(I)

at a molar ratio (I) in the range of not less than 1 to not more than 99, and at least one branched chain structure selected from the group consisting of the formulas II and III at a molar ratio (I) of not less than 1 to not more than 49:

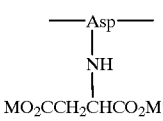

(II)

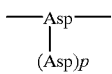

(III)

wherein the term "molar ratio (I)" used herein means the ratio based on the number of moles (100) of a total aspartic residue of a modified polyaspartic acid, and Asp denotes an aspartic residue, n an integer of not less than 1 to not more than 25, and m an integer of not less than 2 to not more than 2n, M and M' independently denote a hydrogen atom, an ammonium, or a metal such as sodium, potassium, magnesium, calcium, strontium and the like, and (Asp)p therein denotes a branched chain. The (Asp)p is preferred to originate in the production of a polyaspartic acid and p, though not specifically defined, is generally preferred to be an integer falling in the range of 2–1000.

In the case of partial structure (I) plus the branched chain structure of formula (III), {the molar ratio (I) of formula (I)} plus 2×{the molar ratio (I) of formula (III)} can not exceed 100. This is because a partial structure represented by formula (I) is able to exist in the side chain, (Asp)p, of formula (III). In the case of partial structure (I) plus the branched chain structure of formula (II), {the molar ratio (I) of formula (I)} plus 2×{the molar ratio (I) of formula (II)} can not exceed 100. In the case of partial structure (I) plus the branched chain structure of formula (II) plus the branched chain structure of formula (III), {the molar ratio (I) of formula (I)} plus 2×{the molar ratio (I) of formula (II)} plus 2×{the molar ratio (I) of formula (III)} can not exceed 100.

The weight average molecular weight of the modified polyaspartic acid mentioned above is preferred to be in the range of $1500-2 \times 10^6$.

The partial structure (I) mentioned above is preferred to be the formula represented by the following formula:

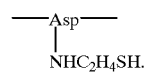

The modified polyaspartic acid mentioned above is preferred to have a calcium ion bonding force of not less than 17 $M^{-1}$ to not more than 220 $M^{-1}$ based on the molar concentration of a carboxyl group at 25° C.

The modified polyaspartic acid mentioned above is preferred to have a molar ratio of partial structure to branched chain structure in the range of 98–2:1–49.

The modified polyaspartic acids of this invention can be classified into two: (I) mercapto amine modified polyaspartic acids and (II) mercapto amine aspartic acid modified polyaspartic acids. Here, cysteamine is preferably used as a typical example of mercapto amines. When the molecular structure of cysteamine is viewed in connection with the function thereof, the amino group is thought to discharge the role of forming an amide bond with a polyaspartic acid, and the mercapto group is important for the manifestation of an effect in the protection of metal. The ethylene chain (—$CH_2CH_2$—) which is present in the molecular structure of cysteamine assumes the role of a so-called cord for binding a mercapto group and an amino group and is not thought to exhibit a direct activity in the prevention of metal corrosion. That is, the ethylene chain which binds a mercapto group and an amino group, even when substituted with other hydrocarbon chain, can be expected to exhibit the same effect as in the case of cysteamine. For the reason adduced herein, it is natural to regard an amine having a mercapto group represented by the formula, HS—$C_nH_m$—$NH_2$, as falling in the scope of this invention.

Regarding the moiety, —$C_nH_m$—, it may be cited, for example, straight chains, branched chains, and aromatic rings. As regards the number, n, of carbon atoms, n=1 and m=2 are thought to be minimal in consideration of the possibility of the reaction proceeding while allowing the generation of HS—$C_nH_m$—$NH_2$ to continue meanwhile. The upper limit of the number, n, of carbon atoms is thought to be approximately 25 as a yard stick, though rather loosely. On the precondition that the compound represented by the formula, HS—$C_nH_m$—$NH_2$, allow easy application of the procedure contemplated by this invention and enjoy a small application rate as a raw material, the preferred range of n may be not less than 2 to not more than 12 and the preferred range of m may be not less than 4 to not more than 2n.

As typical examples of the formula, HS—$C_nH_m$—$NH_2$ (mercapto amine), cysteamine, it may be preferably cited o- or p-aminobenzenethiol, 2-dimethylaminoethanethiol, 1-amino-2-methyl-2-propanethiol etc. From the viewpoint of production, cysteamine proves particularly advantageous in respect that the application rate (weight) can be decreased and the efficiency of commercial use can be improved by decreasing the molecular weight.

(I) Mercapto Amine Modified Polyaspartic Acids

The methods described herein below as Reaction procedure I and Reaction procedure II can be applied to the compounds represented by the formula, HS—CnHm—$NH_2$. The salts such as, for example, hydrochlorides, sulfates, and carbonates, of the compounds represented by the formula, HS—CnHm—$NH_2$ and mercapto amine precursors such as thiazolidine, methylthiazolidine, dimethylthiazolidine (this compound is more preferable.) which can be converted into mercapto amines under the reaction conditions, therefore, fall in the range of compounds represented by the formula, HS—CnHm—$NH_2$.

The preparation of modified polyaspartic acids by the use of compounds represented by the formula, HS—CnHm—$NH_2$, and salts thereof can be effected under the same conditions as those for the preparation of cysteamine modified polyaspartic acids. Examples I-10 cited herein below are examples of the preparation of o-aminobenzenethiol modified polyaspartic acids by the use of Reaction procedure I.

The compounds represented by the formula, HS—CnHm—$NH_2$, will be described below with reference to the case of using cysteamine as a typical example.

Cysteamine modified polyaspartic acids and the salts usually do not need to be strictly discriminated in terms of the conditions of use. In the following description, thus, the term "cysteamine modified polyaspartic acid" means both free acid and the salt thereof.

Cysteamine Modified Polyaspartic Acid

The term "cysteamine modified polyaspartic acid" as used in this invention refers to what is produced by a procedure which is characterized by polymerizing an ammonium salt of maleic acid by application of heat thereby forming an anhydro polyaspartic acid, modifying the polymerized acid with cysteamine, and then subjecting the modified polymer to a hydrolytic treatment. The hydrolytic treatment is a known operation and permits use of not only an alkaline aqueous solution but also water or an acidic aqueous solution.

In the following description, the term "cysteamine" is to be construed as meaning not merely cysteamine but also a compound or composition having the same reactivity as cysteamine. In the following description, therefore, the expression "operation of reacting cysteamine" not only means the operation of effecting reaction of free cysteamine but also the operation of effecting reaction of a compound or a composition which easily decomposes and consequently forms cysteamine, the operation of adding a salt of cysteamine to a basic substance and allowing them to react and the operation of allowing the cysteamine precursor to react. In describing cysteamine as a chemical substance, the expression "free cysteamine" will be specifically used.

Characteristic from the Viewpoint of Procedure for Reaction

When ammonium hydrogen maleate as a raw material is heated and left reacting, it is gradually melted and liquefied with a temporary decrease of viscosity. As the polymerization reaction proceeds, the formed liquid grows again in viscosity and finally solidifies. The important point of this invention resides in effecting reaction of cysteamine or a salt of cysteamine with the reactant when it begins to gain in viscosity and assumes a viscous liquid or pasty state. At this point, an anhydro polyaspartic acid may be already formed.

The reaction of cysteamine or a salt of cysteamine therewith is preferred to start at the time that the reactant assumes a pasty state. Specifically, this time is about 20–40 minutes after the raw material thoroughly melts under the heating condition of 160° C. In this case, the effect of the finally produced cysteamine modified polyaspartic acid in preventing corrosion is about 10 to 100 times as high as that of the conventional polyaspartic acid.

The amount of the cysteamine or the salt of cysteamine to be used in the synthesis of a cysteamine modified polyaspartic acid is variable. Since the cysteamine is thought to form an amide bond with a carboxyl group of polyaspartic acid and give rise the cysteamine modified polyaspartic acid, the theoretically allowable molar ratio of cysteamine or salt of cysteamine to the aspartic acid residue ought to be in the range of 0–100:100. When (1) the molar ratio of cysteamine or salt of cysteamine is in the neighborhood of 0, however, the reaction is thought to be equal to that for the synthesis of ordinary polyaspartic acid. When (2) the molar ratio of cysteamine or salt of cysteamine is in the neighborhood of 100, it is suspected that the reaction will not be carried out completely. For these reasons (1) and (2), the practical molar ratio of the cysteamine or the cysteamine salt to the aspartic acid residue is generally though to be in the range of 1–99:100, preferably 2–90:100, and especially 2–50:100.

Now, the method for the preparation of the cysteamine modified polyaspartic acid will be described in detail below.

The cysteamine modified polyaspartic acid is obtained by the method of synthesis which comprises heating an ammonium hydrogen maleate to melt and modefying the molten material with cysteamine.

Though the ammonium hydrogen maleate to be used as the raw material is not specifically defined, it is practical to adopt what is prepared from maleic acid and ammonia (water).

The ammonium hydrogen maleate is melted by being heated in an inert atmosphere such as of nitrogen, helium, or argon. The heating temperature is generally in the range of 100–180° C., preferably in the range of 130–170° C. When the ammonium hydrogen maleate is heated, it is gradually melted and liquefied with a temporary decrease of viscosity. As the reaction subsequently proceeds, the formed liquid grows again in viscosity and finally solidifies. In the present specification, the term "melt" refers to the condition in which the reaction mixture containing the ammonium hydrogen maleate or the reaction product assumes a viscous liquid or pasty state before it is solidified. Since the rise of viscosity is observed in this condition, it is plain that the anhydro polyaspartic acid is already formed.

Several methods are conceivable for the purpose of allowing cysteamine or a salt of cysteamine to react. The procedure for the reaction varies and the quality of the produced cysteamine modified polyaspartic acid varies as well with the quality of the cysteamine or the salt of cysteamine. Here, the reaction will be described respectively with reference to (1) the case of effecting the reaction by the addition of cysteamine or a compound or composition easily liberating cysteamine under the reaction conditions (hereinafter abbreviated as "Reaction procedure 1") and (2) the case of effecting the reaction by the addition of a compound or composition not considered to liberate cysteamine easily (hereinafter abbreviated as "Reaction procedure 2").

Reaction procedure 1: First, the case of effecting the reaction by the addition of cysteamine or a compound or composition easily liberating cysteamine under the reaction conditions will be described.

The reaction of free cysteamine is attainable by a method of directly adding the cysteamine in a liquid state, a solid state, or a gaseous stage to the reaction vessel and causing it to react therein, and a method of generating the cysteamine within the reaction system and causing it to react therein. Since the free cysteamine is liable to oxidation, however, the practice of converting it into a salt by reaction with an acid and handling it as the salt is resorted more often than not. The commercial production, therefore, is attained advantageously by (1) a method of effecting the reaction by using a compound easily decomposed to produce cysteamine and (2) a method of using a salt of cysteamine, generating a compound having the same reactivity as (i) free cysteamine or (ii) cysteamine, and causing the reaction of this compound. In these methods of (1) and (2), it is advantageous because of the ease of operation that the method of (2) is executed by throwing a salt of cysteamine and a basic substance into the reaction system, consequently generating a compound possessing the same reactivity as free cysteamine or cysteamine, and inducing modification of an anhydro polyaspartic acid is advantageous because of the ease of operation.

The reaction of cysteamine is started at the time that the ammonium hydrogen maleate as the raw material melts and assumes a viscous liquid or pasty state. The state of this kind is varied by the temperature of heating. When the temperature of heating is 160° C., for example, the time occurs about 10–50 minutes, preferably 20–40 minutes, after the raw material melts completely. Though the cysteamine may be added after it has solidified, the addition of this manner is at a disadvantage in suffering the product to acquire a heterogeneous texture due to insufficient mixing. To be practically advantageous, the procedure for effecting the reaction comprises adding the salt of cysteamine to the reaction mixture, thoroughly mixing them, immediately adding the basic substance to the resultant mixture, and inducing reaction thereof. The time intervening between the addition of the salt of cysteamine and the addition of the basic substance is practically within five minutes including zero time. Preferably, this range is 10 seconds to two minutes.

As concrete examples of the salt of cysteamine to be used in this procedure for reaction, hydrochlorides, sulfates, and phosphates maybe cited. More specifically, the salts may include cysteamine hydrochloride, cysteamine sulfate, cysteamine hydrogen sulfate, cysteamine phosphate, cysteamine hydrogen phosphate, cysteamine dihydrogen phosphate, cysteamine carbonate, and cysteamine acetate. Among other salts of cysteamine mentioned above, cysteamine hydrochloride proves particularly advantageous commercially in terms of the ease of procurement.

As concrete examples of the basic substance to be used in the reaction, it may be cited, for example, alkali metal oxides such as lithium oxide, sodium oxide, and potassium oxide and alkaline earth metal oxides such as magnesium oxide, calcium oxide, and strontium oxide; alkali metal hydroxides such as lithium hydroxide, sodium hydroxide, and potassium hydroxide and alkaline earth metal hydroxides such as magnesium hydroxide, calcium hydroxide, and strontium hydroxide; alkali metal carbonates such as lithium carbonate, sodium carbonate, and potassium carbonate and alkaline earth metal carbonates such as magnesium carbonate, calcium carbonate, and strontium carbonate; alkali metal hydrogen carbonates such as lithium hydrogen carbonate, sodium hydrogen carbonate, and potassium hydrogen carbonate; zinc oxide, zinc hydroxide, and zinc carbonate. Among other basic substances cited above, sodium carbonate, potassium carbonate, magnesium oxide, magnesium carbonate, calcium hydroxide, and calcium carbonate prove advantageous and sodium carbonate and calcium carbonate prove particularly advantageous in terms of the ease of procurement. The amount of the basic substance to be used may be increased or decreased as occasion demands, based on the amount of the basic substance reacts with the salt of cysteamine neither excessively nor insufficiently. When such a monobasic acid salt of cysteamine as cysteamine hydrochloride is used, therefore, the amount of the basic substance is about one equivalent weight. When such a dibasic acid salt of cysteamine as a sulfate is used, the amount of the basic substance is about two equivalent weights. When such a polybasic acid salt of cysteamine as a phosphate is used, the amount of the basic substance to be used may be decreased because the use of the basic substance in an equivalent weight tends to impart a basic quality to the reaction system.

The cysteamine modified anhydro polyaspartic acid to be obtained consequently is hydrolyzed by the well-known method and consequently converted into cysteamine modified polyaspartic acid. When this hydrolysis is effected by the use of an alkali, the alkali is preferred to be used approximately in one equivalent weight based on one (mole) of {(number of moles of aspartic acid residue)–(number of moles of cysteamine residue)}. For this treatment of hydrolysis, it may be used, for example, alkali metal hydroxides such as lithium hydroxide, sodium hydroxide, and potassium hydroxide, alkali metal carbonates such as sodium carbonate and potassium carbonate, ammonia water or organic amines such as ethanol amine, water, or aqueous solution acidified with sulfuric acid and hydrochloric acid.

Reaction procedure II: The case of effecting the reaction by the addition of a compound or composition not thought to liberate cysteamine easily will be described.

The salt of a strong acid or an acid approximating closely to a strong acid with cysteamine is stable and not thought to liberate easily cysteamine. Particularly, since this dissociation is not easily attained under a mild condition such as of an aqueous solution, cysteamine hydrochloride, for example, cannot be expected exhibit the same reactivity as free cysteamine. In contrast, since the reaction conditions contemplated by this invention are harsh, the dissociation is easily attained and the free cysteamine produced in consequence of the dissociation quickly reacts with the anhydro polyaspartic acid which is present copiously in the reaction system. I have taken notice of the equilibrium of dissociation of a salt of cysteamine and have pursued a study in search of a simple method for the synthesis of cysteamine modified polyaspartic acid.

The salts of cysteamine usable for the modification of the anhydro polyaspartic acid may include salts of strong acids or acids approximating closely to strong acids such as hydrochlorides, sulfates, and phosphates and salts of weak acids such as acetates, carbonates, and hydrogen carbonates. Since the salts of weak acids are thought to be easily decomposed under the reaction conditions of this invention, it is considered proper to include them among the category of compounds and compositions which easily dissociate cysteamine under the reaction conditions mentioned above. Among other salts of strong acids or acids approximating closely to strong acids mentioned above, hydrochlorides prove particularly advantageous in terms of the ease of procurement. With these considerations in mind, I have pursued a study in search of a method for the synthesis of cysteamine modified polyaspartic acid by the use of a salt of cysteamine.

The reaction of the salt of cysteamine is started at the time that the ammonium hydrogen maleate as the raw material melts and assumes a viscous liquid or pasty state. The state of this sort varies with the temperature of heating. When the temperature of heating is 160° C., for example, the time under discussion occurs about 10–50 minutes, preferably 20–40 minutes, after the raw material melts completely. Though the salt of cysteamine may be added after it has solidified, the addition of this manner is at a disadvantage in suffering the product to acquire a heterogeneous texture due to insufficient mixing. To be practically advantageous, the procedure for effecting the reaction comprises adding the salt of cysteamine, particularly hydrochloride of cysteamine, to the reaction mixture, and inducing reaction thereof.

The cysteamine modified anhydro polyaspartic acid to be obtained consequently is hydrolyzed by the well-known method and consequently converted into cysteamine modified polyaspartic acid. When this hydrolysis is effected by the use of an alkali, the alkali is preferred to be used approximately in one equivalent weight based on 1 (mole) of the aspartic acid residue. For this treatment of hydrolysis, alkali metal hydroxides such as lithium hydroxide, sodium hydroxide, and potassium hydroxide, alkaline earth metal hydroxides such as calcium hydroxide, alkali metal carbonates such as sodium carbonate and potassium carbonate, ammonia water or organic amines such as ethanol amine, water, or aqueous solutions of sulfuric acid and hydrochloric acid may be used.

Estimated Structure of Cysteamine Modified Polyaspartic Acid

At the time of effecting the reaction of cysteamine, the fusion of the raw material and the subsequent increase of the viscosity of the reactant are already observed. Evidently, these phenomena indicate the formation of structure of anhydro aspartic acid. The method of the reaction contemplated by this invention is characterized by effecting the modification of the structure of anhydro polyaspartic acid with cysteamine without requiring the use of a reaction solvent such as an organic solvent or water. The cysteamine modified anhydro polyaspartic acid, when subjected to a treatment of hydrolysis by the well-known method, is converted into cysteamine modified polyaspartic acid.

The metal ion bonding force is measured in order to clarify the differences between the cysteamine modified polyaspartic acid of the present invention and the cysteamine modified polyaspartic acid according to U.S. Pat. No. 4,363,797. The product of this invention and the polyaspartic acid (CF-110) corresponding to the product of this invention showed metal ion bonding force in the range of 17–21 $M^{-1}$. In contrast, the cysteamine modified polyaspartic acid of U.S. Pat. No. 4,363,797 showed metal ion bonding force of 15 $M^{-1}$ and the polyaspartic acid synthesized separately by polymerizing aspartic acid showed metal ion bonding force of 9 $M^{-1}$. The difference observed between the sample of U.S. Pat. No. 4,363,797 and the polymer of aspartic acid is suspected to reflect the difference in the amounts of α- and β-amide bond structures present. Since the metal ion bonding force exhibits a high numerical value when a chelate-forming structure is present in the molecule, the fact that the product of this invention manifests the metal ion bonding force of a high magnitude, signifies copious presence of a chelate structure.

In the case of the cysteamine modified polyaspartic acid, the term "chelate structure" means a succinic acid type structure, $MO_2CH_2CHCO_2M'$, which is present at a carboxyl terminal (wherein M and M' independently denote a hydrogen atom, an ammonium, or a metal). The amount of the structure at the carboxyl terminal corresponds to the amount of a branched chain structure present. Thus, it is inferred that a branched chain structure is present in the molecule of the product of this invention.

The metal ion bonding force which characterizes the product of this invention, is estimated to have the lower limit thereof at 17 $M^{-1}$. The estimated upper limit of the metal ion bonding force is 220 $M^{-1}$. As for these estimated values, the discussion given herein below is worthy of reference, concerning the cysteamine aspartic acid modified polyaspartic acid.

The metal ion bonding force used herein about the polyaspartic acid and the modified polyaspartic acid mentioned above is indicated on the basis of the molar concentration of the carboxyl group determined by using $Ca^{2+}$ as a metal ion.

(II) Mercapto Amine Aspartic Acid Modified Polyaspartic Acid

Here, the following description is given with reference to the case of using cysteamine as a typical example of the compounds represented by the formula, $HSCnHmNH_2$. For the other mercapto amines, the procedure for reaction to be performed is the same as that performed in the case of using cysteamine.

The modified polyaspartic acid of this invention is one kind of cysteamine modified polyaspartic acids from the viewpoint of the composition of monomer. In comparison with the conventional cysteamine modified polyaspartic acid (U.S. Pat. No. 4,363,797 and JP-A-06-248072), however, it ought to be regarded as a cysteamine aspartic acid modified polyaspartic acid. For this reason, the cysteamine modified aspartic acid of this part in this invention will be referred to, in the following description, as cysteamine aspartic acid modified polyaspartic acid for discrimination from the conventional product.

From the viewpoint of the formation of a molecular structure, the cysteamine aspartic acid modified polyaspartic acid of this invention is synthesized by a novel process for the formation of a branched chain of aspartic acid, namely, by the introduction of a structure control factor. It is suspected that the cysteamine aspartic acid modified polyaspartic acid is inhabited copiously by a succinic acid type structure, $\{—CH(COOM)—CH_2—COOM'\}$ (wherein M and M' independently denote a hydrogen atom, an ammonium, or a metal). Theoretically, the number of the succinic acid type structures in the cysteamine aspartic acid modified polyaspartic acid can reach about ½ of the total number of aspartic acid residues. This number is unattainable by the conventional method for industrial synthesis.

More often than not, cysteamine aspartic acid modified polyaspartic acids and the salts thereof do not need to be strictly discriminated in terms of the conditions of use. In the following description, thus, the term "cysteamine aspartic acid modified polyaspartic acid" means both the free acid and the salt thereof. Particularly when the free acid is required to indicate, it will be referred to as free cysteamine aspartic acid modified polyaspartic acid. When the salt is required to be indicated as distinguished from the free acid, it will be referred to as free cysteamine aspartic acid modified polyaspartic acid salt, with the word "salt" added as shown above.

Characteristic in Terms of Procedure for Reaction

The characteristic equals to that in terms of procedure for reaction described in the preceding paragraph concerning (I) mercapto amine modified polyaspartic acids, except for the following items.

The range of the molar ratio of the salt of aspartic acid or the aspartic acid to the cysteamine or the salt of cysteamine, to be used for modifying polyaspartic acid, can be defined by the structure of molecule and the physical properties. The actual modification is performed on the anhydro polyaspartic acid. It is, therefore, rational to indicate the molar ratio of the salt of aspartic acid or the aspartic acid to be used for the modification on the basis (100) of the number of moles of total aspartic acid residues in the anhydro polyaspartic acid. In the present invention, the molar ratio indicated on the basis (100) of the number of moles of total aspartic acid residues of the anhydro polyaspartic acid will be particularly indicated as "molar ratio (II)."

As regards the range of the amount of the salt of aspartic acid or the aspartic acid to be used for modifying polyaspartic acid, if this amount is unduly small, the modification to be attained will be much the same as when no modification is made. Further, from the standpoint of the reaction, this amount is not allowed theoretically to surpass {100−(ratio of modification by cysteamine)}. The practical range of the molar ratio (II) of the amount of the salt of aspartic acid or the aspartic acid to be used is thought to be not less than 2 to not more than 99. The practically allowable molar ratio (II) of the cysteamine or the salt of cysteamine to be used for the modification is approximately not less than 1 to not more than 98.

From the viewpoint of the procedure for reaction, the range of the molar ratio {molar ratio (II)} of the salt of aspartic acid or the aspartic acid to the cysteamine or the salt of cysteamine, to be used for the modification of polyaspartic acid, may surpass the range mentioned in the preceding description. In this case, the salt of aspartic acid or the aspartic acid and the cysteamine or the salt of cysteamine, to be used for the modification, partly remain without reacting.

Aspartic acid and various salts of aspartic acid, as shown below, are usable as a modifying agent. As concrete examples of hydrogen aspartate, alkali metal salts such as lithium hydrogen aspartate, sodium hydrogen aspartate, and potassium hydrogen aspartate; alkaline earth metal salts such as magnesium hydrogen aspartate, calcium hydrogen aspartate, strontium hydrogen aspartate, and barium hydrogen aspartate; ammonium hydrogen aspartate; and hydrogen aspartates of various light metals and heavy metals as zinc hydrogen aspartate, iron hydrogen aspartate, and copper hydrogen aspartate may be cited. As concrete examples of salts (normal salts) of aspartic acid, alkali metal salts such as dilithium aspartate, disodium aspartate, and dipotassium aspartate; alkaline earth metal salts such as magnesium aspartate, calcium aspartate, strontium aspartate, and barium aspartate; diammonium aspartate; and aspartates of various light metals and heavy metals such as zinc aspartate, iron aspartate, and copper aspartate may be cited.

Among other modifying agents mentioned above, alkali metal salts (normal salts and hydrogen salts), alkaline earth metal salts (normal salts and hydrogen salts), and ammonium salts (normal salts and hydrogen salts) of aspartic acid prove preferable, alkali metal salts (hydrogen salts), alkaline earth metal salts (hydrogen salts), and ammonium salts (hydrogen salts) of aspartic acid prove more preferable, and sodium hydrogen aspartate, magnesium hydrogen aspartate, calcium hydrogen aspartate, and ammonium hydrogen aspartate prove most preferable.

These hydrogen aspartates, aspartates, and aspartic acid may be anhydrides or may possess or water of adsorption. They have in common the procedure for reaction during the modification.

Various salts of cysteamine are usable as a modifying agent. As concrete examples of the salt of cysteamine, it may be cited, for example, cysteamine hydrochloride, cysteamine sulfate, cysteamine hydrogen sulfate, cysteamine phosphate, cysteamine hydrogen phosphate, cysteamine dihydrogen phosphate, cysteamine carbonate, and cysteamine acetate. Among other salts of cysteamine mentioned above, cysteamine hydrochloride proves commercially advantageous in terms of the ease of procurement.

Various derivative salts of cysteamine aspartate are also usable as a modifying agent, such as cysteamine aspartate, cysteamine hydrogen aspartate, lithium cysteamine aspartate, sodium cysteamine aspartate, potassium cysteamine aspartate, ammonium cysteamine aspartate, magnesium cysteamine aspartate, calcium cysteamine aspartate, strontium cysteamine aspartate, and zinc cysteamine aspartate.

The reaction of a varying modifying agent cited above with the anhydro polyaspartic acid maybe attained by separately adding them successively or by mixing them with each other. From the viewpoint of the procedure for reaction, the reaction is effected preferably by preparatorily mixing the modifying agent with the anhydro polyaspartic acid and adding the resultant mixture to the reaction system.

The cysteamine aspartic acid modified anhydro polyaspartic acid consequently obtained is subjected to a treatment of hydrolysis which is performed by the well-known method. The amount of the alkali preferably used in the treatment of hydrolysis is (1) approximately one equivalent weight based on one mole of {(number of moles of total aspartic acid residue)−(number of moles of cysteamine)} when aspartic acid and cysteamine are used as modifying agents, (2) approximately one equivalent weight based on one mole of {(number of moles of total aspartic acid residue)−(number of equivalent weights of hydrogen aspartate consumed in the reaction)−(number of moles of cysteamine)} when hydrogen aspartate and cysteamine are used as modifying agents, (3) approximately one equivalent weight based on one mole of {(number of moles of total aspartic acid residue)−2×(number of equivalent weights of normal salt of aspartic acid consumed in the reaction)−(number of moles of cysteamine)} when normal salt of aspartic acid and cysteamine are used as modifying agents, (4) approximately one equivalent weight based on one mole of (number of moles of total aspartic acid residue) when aspartic acid and a salt of cysteamine are used as modifying agents, (5) approximately one equivalent weight based on one mole of {(number of moles of total aspartic acid residue)−(number of equivalent weights of hydrogen aspartate consumed in the reaction)} when hydrogen aspartate and a salt of cysteamine are used as modifying agents, (6) approximately one equivalent weight based on one mole of {(number of moles of total aspartic acid residue)−2×(number of equivalent weights of normal salt of aspartic acid consumed in the reaction)} when normal salt of aspartic acid and a salt of cysteamine are used as modifying agents, (7) approximately one equivalent weight based on one mole of {(number of moles of total aspartic acid residue)−2×(number of moles of cysteamine aspartate)} when cysteamine aspartate is used as a modifying agent, (8) approximately one equivalent weight based on one mole of {(number of moles of total aspartic acid residue)−(number of moles of cysteamine hydrogen aspartate)} when cysteamine hydrogen aspartate is used as a modifying agent, and (9) approximately one equivalent weight based on one mole of {(number of moles of total aspartic acid residue)−2×(number of moles of normal salt of aspartic acid consumed in the reaction)} when normal salt such as sodium cysteamine aspartate is used as a modifying agent. The expression "(number of equivalent weight of salt of aspartic acid consumed in the reaction)" as used herein means the number of moles of aspartate radical. The amounts to be used in the above hydrolysis (1)–(9) equal the theoretical amounts of relevant bases required for neutralizing, neither excessively nor insufficiently, the carboxyl groups of the cysteamine aspartic acid modified polyaspartic acids which are formed by hydrolyzing cysteamine aspartic acid modified anhydro polyaspartic acid.

Molecular Structure of Cysteamine Aspartic Acid Modified Polyaspartic Acid

The molecular structure of cysteamine aspartic acid modified polyaspartic acid will be estimated based on (1) the observation during the operation for reaction and (2) the comparison of physical properties.

(1) Estimation of Molecular Structure Based on Observation During Operation for Reaction At the time that a salt of aspartic acid or aspartic acid and cysteamine or a salt of cysteamine are added, the fusion of raw materials and the subsequent rise of viscosity of the reactant are already observed. Evidently, these phenomena indicate the formation of anhydro aspartic acid, a dehydrate of polyaspartic acid. The method of the reaction contemplated by this invention is characterized by forming anhydro polyaspartic acid without using a reaction solvent such as an organic solvent or water and immediately modifying this anhydro polyaspartic acid with a salt of aspartic acid or aspartic acid and cysteamine or a salt of cysteamine. The modified anhydro polyaspartic acid, when subjected to a treatment of hydrolysis by the well-known method, is converted into a corresponding modified polyaspartic acid.

Under the reaction conditions of the present invention, (1) the salt of aspartic acid or the aspartic acid is not easily polymerized and (2) the addition of the salt of aspartic acid or the aspartic acid and cysteamine or the salt of cysteamine presumably causes a rapid reaction in the reaction mixture as evinced by the fact that the reaction mixture shows a clear sign of rapid rise of viscosity and subsequent solidification. These facts of (1) and (2) evidently support an inference that the salt of aspartic acid or the aspartic acid used in the reaction gives birth to a side chain formed of one aspartic acid and that the cysteamine or the salt of cysteamine forms an amide bond with an anhydro polyaspartic acid.

As respects the bondage of the introduced aspartic acid residue, it is inferred from the reactivity of the functional group and the behavior thereof during the treatment of hydrolysis that the salt of aspartic acid or the aspartic acid yields to a nucleophilic reaction and forms an amide bond (partial structure 1, wherein M and M' independently denoting a hydrogen atom, a metal atom, or an ammonium and pahAsp denoting an anhydro polyaspartic acid moiety):

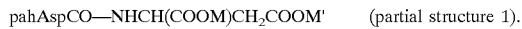

pahAspCO—NHCH(COOM)CH$_2$COOM'  (partial structure 1).

During the synthesis of anhydro polyaspartic acid or during the reaction of anhydro polyaspartic acid with the salt of aspartic acid or the aspartic acid, there is the possibility that the reaction will form —NHCO— in the main chain of the anhydro-polyaspartic acid demands due consideration. As a result, there is the possibility of the partial structure 2 being formed as bonded to the main chain of the polyaspartic acid:

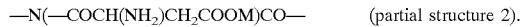

—N(—COCH(NH$_2$)CH$_2$COOM)CO—  (partial structure 2).

In the formula, the aspartic acid residue indicated in the parentheses, ( ), means the aspartic acid residue which is bonded directly to the nitrogen atom in the main chain of the anhydro polyaspartic acid. The residue is thought to release in the treatment of hydrolysis in the same manner as the imide ring of anhydro polyaspartic acid. The examples cited herein used an alkali metal hydroxide (base) in an amount theoretically required for neutralizing the carboxyl group of the polyaspartic acid which was formed during the treatment of hydrolysis. If the partial structure 2 is important for the modified polyaspartic acid, the amount of the base so used will be excessive and the product of the hydrolysis ought to assume considerable alkalinity. Actually, the product of hydrolysis assumed neutrality to weak alkalinity. It is, therefore, proper to conclude that the partial structure 2 is not important for the modified polyaspartic acid.

The consideration of the matters discussed above supports an inference that the salt of aspartic acid or the aspartic acid utilized in the reaction as a modifying agent produces an amide bond with anhydro polyaspartic acid and consequently gives rise to a side chain (partial structure 1) formed of one aspartic acid.

It is inferred from the reactivity of the functional group of cysteamine, it is inferred that the cysteamine residue has a bond of the following form.

pahAspCO—NHCH$_2$CH$_2$SH  (partial structure 3)

(2) Estimation of Molecular Structure Based on Physical Properties

The metal ion bonding force, unlike the metal ion bonding capacity, directly reflect the molecular structure. The modified polyaspartic acid and the polyaspartic acid have an aspartic acid residue bonded thereto. Most metal bonding groups are considered to be carboxyl groups. The amino group at the N terminal is not thought to be important. The reason for this conjecture is (1) that the amount of the aspartic acid residue itself possibly existing as an N terminal is small, (2) that the amino group has nucleophilicity and, therefore, has high possibility of being consumed at the stage of formation of anhydro polyaspartic acid, and (3) that the metal ion bonding force of the N terminal aspartic acid residue, as viewed in terms of the stability constant of the complex of calcium as with glycine or alanine (Seikagaku Deta Book), is not thought to be very high. A logical conclusion, therefore, is that the metal ion bonding force directly reflects the state of bondage of the aspartic acid residue.

Based on the consideration of the matters discussed above, the metal ion bonding force was measured. The metal ion bonding force mentioned in the present description is determined on the basis of the concentration of the carboxyl group obtained by using Ca ion as a probe and analyzing the data of determination by the Oda plotting (refer to metal ion bonding forces indicated in the examples).

The cysteamine modified polyaspartic acid synthesized in accordance with the disclosure of U.S. Pat. No. 4,363,797 showed a metal ion bonding force of 15 M$^{-1}$. The polyaspartic acid obtained by polymerizing aspartic acid showed a metal ion bonding force of 9 M$^{-1}$. This variation is thought to originate in the fact that the state of amide bond of the aspartic acid residue exists in the two kinds, $\alpha$ and $\beta$, and that the ratio of the state of bond, $\alpha$, and the state of bond, $\beta$, varies with the condition of synthesis. As a result, the metal ion bonding forces of the polyaspartic acid and the modified polyaspartic acid which have no branched chain, are thought to fall in the range of 9–15 M$^{-1}$. In contrast, the polyaspartic acid CF-110 synthesized by using maleic acid as a raw material and the cysteamine modified polyaspartic acid corresponding to CF-110 showed metal ion bonding forces of 17–21 M$^{-1}$. This numerical value is thought to originate from the presence of a certain amount of branched chain. The cysteamine aspartic acid modified polyaspartic acid of this invention, when the ratio of modification of aspartic acid is low, equals cysteamine modified polyaspartic acid in fact. The metal ion bonding force which characterizes the cysteamine aspartic acid modified polyaspartic acid of this invention, therefore, has 21 M$^{-1}$ as the lower limit thereof. From the fact that a sample having a succinic acid structure of 25 in molar ratio (I) showed a metal ion bonding force of 59–64 $M^{-1}$, the upper limit is estimated to be 100–111 $M^{-1}$.

In the case of the polyaspartic acid which is produced by polymerizing aspartic acid and the cysteamine modified polyaspartic acid, the metal ion bonding forces showed variations approximating closely to 2 times for the reason possibly ascribable to the change in the ratio of the state of bond, α, and the state of bond, β, of the aspartic acid residue in the main chain. In consideration of the matters discussed above, the upper limit of the metal ion bonding force characterizing the cysteamine aspartic acid modified polyaspartic acid of this invention has the possibility of reaching 220 $M^{-1}$. The range of metal ion bonding force of the cysteamine aspartic acid modified polyaspartic acid, therefore, is 21–220 $M^{-1}$ as the standard.

It is, therefore, plain that the cysteamine aspartic acid modified polyaspartic acid of this invention is different from such well-known countertypes as cysteamine modified polyaspartic acid (U.S. Pat. No. 4,363,797).

The form in which the salt of aspartic acid or the aspartic acid used as a modifying agent is bonded possibly exists in two kinds, i.e. (1) the kind which forms a side chain, decreases the partial structure equivalent to the conventional product, consumes the carboxyl group at the cite of modification, and forms a carboxyl terminal newly {form (1) of bond] and (2) the kind which involves incorporation within or at the terminal of a macromolecular chain {form (2) of bond}. The possible form of presence of an aspartic acid residue in a modified polyaspartic acid occurs in the four kinds, i.e. (1) the kind in which the residue occurs at a carboxyl terminal and has two carboxyl groups (succinic acid type structure) {form (1) of presence}, (2) the kind in which the residue occurs halfway in the length of a molecular chain and has one carboxyl group {form (2) of presence], (3) the kind in which the residue occurs at the cite of branching of a molecular chain and has no carboxyl group {form (3) of presence}, and (4) the kind in which the residue occurs at an amino terminal and has 1 or 0 carboxyl group {form (4) of presence}. In the form (4), among other forms, the amount of presence is one residue per molecule at most. This form (4), depending on the condition of synthesis, is thought to be changed to the form (2) or the form (3) in consequence of the consumption of the amino group by the reaction. Thus, the forms (1)–(3) may be regarded as possible forms of presence of the aspartic acid residue and the form (1) and the form (2) as the forms showing metal ion bonding forces. Among other forms, the form (1) is capable of manifesting a high metal ion bonding force (succinic acid type structure).

When the salt of aspartic acid or the aspartic acid used as a modifying agent is bonded in the form (2), the bond merely increases the length of a macromolecular chain. In this case, it is inferred that the metal ion bonding force is equivalent to that of the conventional polyaspartic acid. When the salt of aspartic acid or the aspartic acid used as a modifying agent is bolded in the form (1), since the form (1) of presence is manifested, it is inferred that the metal ion bonding force is increased. It is, therefore, proper to conclude that the method of this invention allows easy introduction of a succinic acid type structure.

To summarize the description given in this paragraph, the modified polyaspartic acid is inhabited by many side chains each formed of one aspartic acid residue and the number of such side chains, defined in terms of metal ion bonding force, falls in the range of 21–220 $M^{-1}$ as the standard.

Activity of Cysteamine Modified Polyaspartic Acid and Cysteamine Aspartic Acid Modified Polyaspartic Acid in the Prevention of Metal Corrosion The metal corrosion inhibitor of this invention (cysteamine modified polyaspartic acid and cysteamine aspartic acid modified polyaspartic acid) effects the prevention of corrosion by increasing the Faraday resistance (polarization resistance). It can be applied, therefore, to metals in general which can expect the activity in increasing the Faraday resistance in addition to such iron type metals as iron and iron alloys including carbon steel and stainless steel. As typical examples of the subject of application, it may be cited, for example, copper and copper alloys such as brass and cupro-nickel, zinc and zinc alloys, magnesium and magnesium alloys, aluminum and aluminum alloys, nickel and nickel alloys, chromium and chromium alloys, and lead, tin, manganese, cobalt, molybdenum, tungsten, vanadium, and cadmium and the alloys thereof besides the iron type metals mentioned above.

The metal corrosion inhibitor of this invention may be used in combination with such well-known corrosion inhibitors as are capable of being effectively added to an aqueous medium. As concrete examples of the well-known corrosion inhibitor that is usable herein, alkyl amines such as lauryl amine, alkyl ammoniums, sodium thiosulfate, polyaspartic acid, modified polyaspartic acid, modified products of polyaspartic acid, polyaspartic acid derivatives etc. may be cited.

According to this invention, it can provide a modified polyaspartic acid which has a higher ability to prevent corrosion than that of the conventional polyaspartic acid. Particularly, this modified polyaspartic acid can effectively protect metals placed in an environment inhabited by water against corrosion. In this case, the modified polyaspartic acid includes a cysteamine modified polyaspartic acid and a cysteamine aspartic acid modified polyaspartic acid.

Scale Inhibiting Activity of Cysteamine Modified Polyaspartic Acid and Cysteamine Aspartic Acid Modified Polyaspartic Acid The scale which is generally observed is a solid matter which has carbonates, sulfates etc. of alkaline earth metals, particularly Mg, Ca, Sr, and Ba as main components thereof. The mechanism of prevention of the formation of scale is thought to have the two aspects, namely (1) concealing metal ions responsible for the formation of scale and (2) precluding formation of crystal seeds of scale and preventing growth of scale. That is, a metal ion masking agent and a scale inhibitor are thought to have different aspects. The activity in the prevention of scale cannot be easily evaluated solely in terms of the metal ion bonding force mentioned above. For this reason, the cysteamine modified polyaspartic acid and the cysteamine aspartic acid modified polyaspartic acid of this invention were tested for ability to prevent scale and were consequently found to excel in this ability.

While the present invention has been described and discussed with respect to the reaction, physical qualities, and molecular structure, it is characterized by being capable of synthesizing a cysteamine modified polyaspartic acid having a branched chain, particularly advantageously a cysteamine aspartic acid modified polyaspartic acid having incorporated therein a side chain formed of one aspartic acid residue in an intended amount. The cysteamine modified polyaspartic acid and the cysteamine aspartic acid modified polyaspartic acid of the present invention are characterized by manifesting a strong metal ion bonding force and, therefore, enjoying commercial feasibility as a metal ion masking agent, a scale inhibitor, and a metal corrosion inhibitor.

EXAMPLES

Now, this invention will be described specifically below with reference to examples. It should be noted that his invention is not limited to these examples.

In preparation for the description of the examples, the methods for testing metal ion bonding force and ability to prevent scale (ability to preventing formation of calcium carbonate precipitate) will be explained.

Metal Ion Bonding Force

The metal ion bonding force is the index that I have formerly devised for the purpose of identifying a macromolecule capable of forming a bond with a metal ion.

The equilibrium reaction represented by the equation I is established concerning the metal ion (M) and the metal bonding group (paij) possessed by a polymer (macromolecule).

M+paij=M paij $$k\ paij = [M\ paij]/([M][paij]) \quad \text{(equation 1)}$$

wherein i and j respectively fall in the ranges, $1 \leq i \leq m$ and $1 \leq j \leq m$, k paij denotes the bonding constant between a metal ion and a metal bonding group of a sample, and [ ] denotes concentration.

In the equation, the suffix "i" of paij designates the i'th metal bonding group in a total of m metal bonding groups present in the macromolecule and the suffix "j" designates the j'th state of presence in a total of n states of presence. Theoretically, the metal ion bonding force is obtained by finding the product of (bonding constant between the metal bonding group and the metal ion)×(the ratio of the amount of presence of the metal bonding group) for each kind of metal bonding group and each state of presence and then finding the gross total of the products and is represented by the equation 2.

$$\text{Metal ion bonding force} = \sum_{i=1}^{m}\sum_{j=1}^{n}(k\ pa\ ij \cdot r\ ij) \quad \text{(equation 2)}$$

In the case of a polyaspartic acid, m=1 is satisfied because the metal bonding group is practically a sole carboxyl group as explained above.

The metal ion bonding force to be used in this invention is found by a procedure which comprises (1) determining the relation between the Ca ion concentration and the ratio of coloration of a metal indicator NN (2-hydroxy-1-(2-hydroxy-4-sulfo-1-naphthylazo)-3-naphthoic acid) and (2) analyzing the data consequently obtained. The methods of these (1) and (2) will be explained in turn as follows.

(1) Method of determination: The procedure of determining the absorbance of a test solution which is formed from distilled water, a sample, KOH, and a metal indicator is effected as follows. Addition of aliquots of calcium chloride solution is performed until the ratio of coloration of the metal indicator NN substantially reaches 1 (sample added system). The relation between the Ca ion concentration and the ratio of coloration of the metal indicator NN is determined. Decrease in the absorbance due to dilution caused by an increase in the volume of the solution during the course of determination is compensated in accordance with the Lambert-Beer's law. The relation between the Ca ion concentration and the ratio of coloration of the metal indicator NN is also determined of a system omitting the addition of the sample (control system). For both the sample added system and the control system, it is important that the change in the volume of solution should be small. In the determination under discussion, the increment in the final volume of solution was less than 5% relative to the initial volume of solution. In the system involving the ratio of coloration, R=0.5, which will be described specifically herein below, the increment in the volume of solution was controlled to an approximate level of 1% relative to the initial volume of solution.

The compensated absorbance, Ac, is determined in accordance with the equation, Ac=Am(Vo+Vm)/Vo, wherein Vo denotes the initial volume of solution, Vm the total volume of test solution and Am the absorbance of test solution after addition of the metal (Ca) ion solution. The ratio of coloration, R=0, represents the absorbance (Ao) prior to the addition of the metal ion solution. The ratio of coloration, R=1, represents the coloration in the state in which the change in coloration due to the addition of the metal ion solution will not be observed (absorbance, As, after compensation of the increment in the volume of solution). The ratio of coloration, R, can be calculated in accordance with the equation, (Ac−Ao)/(As−Ao).

When a sample contains a divalent metal ion, the sample can be used for the determination after either the metal ion is removed therefrom by a treatment of dialysis, electrodialysis, ion exchange, or formation of precipitate or the divalent metal ion therein is masked by a reaction with a suitable amount of a strong chelating agent such as EDTA. The metal ion concentration or the metal ion total concentration that is used in the analysis of data, does not include the concentration of the divalent metal ion which has reacted with the chelating agent or the Ca ion which has reacted with the chelating agent. When the sample contains a chelating agent, the graph showing the relation between the absorbance and the Ca ion concentration of this sample forms a curve shaped like the letter S in the neighborhood of starting an increase in absorbance and shows no sharp increase (rise) in absorbance. In this case, the intrinsic point of starting an increase in absorbance due to the addition of the aqueous calcium chloride solution is determined by consulting the curve of the concentration of Ca ion added and the absorbance obtained of the control system. The expression "intrinsic point of starting an increase in absorbance" means the point of starting an increase in absorbance that ought to be observed in the absence of the influence of a chelating agent.

Since the metal ion bonding force is found from the difference of the ratio of coloration between the control system and the sample added system, it should pay attention to the accuracy of the determination of absorbance and the accuracy of the measurement of the volume of the aqueous calcium chloride solution to be added. The absorbance has its significance in the study of a change thereof, it is generally measured to five decimal places to obtain data for the analysis. The accuracy of the volume of the aqueous calcium chloride solution to be added falls in the approximate range of 0.1–0.2%.

There are times when the metal indicator NN is decomposed little by little to the extent of bringing a decrease in absorbance and the absorbance is varied by the sample under the conditions of measurement. The change of absorbance along the course of time is compensated by performing the procedure of a series of steps of measurement in accordance with an established schedule of time. Though metal (Ca) ion bonding forces are able to measure at arbitrary temperature, it is measured at 25° C. in this invention.

(2) Analysis of data: The metal ion bonding force is found by analyzing the difference between the sample added system and the control system. Concerning the metal ion concentration and the coloration of the metal indicator obtained on the sample added system, $Tm_{sample}$ ($1/R_{sample}$) and $1/(1-R_{sample})$ are calculated at each addition of the metal ion solution. Further, $[1/(1-R_{standard})]$ corresponding to Tm$_{sample}$ (1/R$_{sample}$) is calculated in accordance with the equation 3 as the standard for the calculation of the effect of the sample:

$$[1/(1-R_{standard})]=\text{kind} \cdot Tm_{sample}(1/R_{sample})-\text{kind} \cdot Tind_{sample} \quad \text{(equation 3)}$$

Rstandard represents the theoretical ratio of coloration of the metal indicator in control system. Though a value of Rstandard is able to obtain in accordance with the equation 3 and an equation, Rstandard=1−1/[1/(1−Rstandard)], it must be noted that the value of [1/(1−Rstandard)] is important in the analysis of data (equation 4). This is the reason [1/(1−Rstandard)] is used as one value.

The bonding constant, kind, of the metal ion (Ca) and the metal indicator NN to be used in the equation 3 is preferred to be found by using the Scatchard (type) plot from the relation of the metal ion concentration and the ratio of coloration of the metal indicator in control system.

The value of Tind is the metal indicator concentration. The suffix, sample, attached to Tm, R, and Tind is intended to indicate that the relevant symbols represent the data obtained of the system incorporating the sample. Specifically, Tm$_{sample}$ represents the metal ion total concentration of the sample added system at the ratio of coloration, R, of the metal indicator, R$_{sample}$ represents the ratio of coloration of the metal indicator in the sample added system, and Tind$_{sample}$ represents the concentration of the metal indicator in the sample added system.

The left part of the equation 3 is indicated in consideration of the correspondence to the Scatchard (type) plot and the part, [1/(1−R$_{standard}$)], is a variable one indicating the value calculated in the left part of the equation 3. The part, [Δ/(1−R$_{sample}$)] is calculated in accordance with the equation 4.

$$[\Delta/(1-R_{sample})]=1/(1-R_{sample})-[1/(1-R_{standard})] \quad \text{(equation 4)}$$

The (regression) line is found by plotting 1/(1−R$_{sample}$) and [Δ/(1−R$_{sample}$)] (It is referred to as Oda plotting). The inclination of the (regression) line, which is represented by Δ, is found by the product of (metal ion bonding force)× (concentration of the metal bonding group). By dividing the inclination of the (regression) line by (concentration of the metal bonding group), therefore, the metal ion bonding force is found. The concentration of the metal bonding group is the initial concentration. The concentration of the metal bonding group at R=0.5 is also adoptable because the relative increment in volume of the solution is almost negligible. In finding the (regression) line, generally the data having 1/(1−R$_{sample}$) in the neighborhood of 2 ought to be handled as deserving important consideration in view of the error of measurement. Further, due attention ought to be paid to the fact that the (regression) line intrinsically passes the origin (0, 0). Since the metal ion bonding force is found from the difference in the ratio of coloration between the control system and the sample added system, the determination tends to yield an error even when the operation of determination is performed with high accuracy. The Oda plot is favorable in respect that the situation of the error of measurement can be visually confirmed. The metal ion bonding forces indicated in the examples are those obtained by analyzing the data of actual measurement with the Oda plot.

Method for Testing Scale Inhibiting Ability (Ability to Prevent Formation of Precipitate of Calcium Carbonate)

An aqueous solution containing calcium chloride (7 mM), a sample (20 ppm), and sodium hydrogen carbonate (17.85 mM, 0.15%) is heated at 70° C. for three hours and then cooled to room temperature. The dissolved Ca ion in the cooled solution is titrated with EDTA (10 mM). The inhibiting ability (%) is found as follows:

$$\text{Inhibiting ability }(\%)=100\times(V_{SI}-V_0)/(V_{NR}-V_0)$$

wherein V$_{SI}$ represents the value of titration at the time of adding the sample (with heating reaction), V$_0$ the value of titration in the absence of the sample (with heating reaction), and V$_{NR}$ the value of titration in the absence of the heating reaction. Since this testing method is susceptible of the influence of the exchange of gas between the liquid phase and the gas phase in the interior of the reaction vessel, it is important to keep the reaction vessel tightly sealed and maintain the net volume of the vessel constant. The numerical values of the inhibiting ability which are stated herein are to be used for mutually comparing the effects of the samples and not to be used for directly comparing with the numerical values given in other pieces of literature. For comparison with other samples, the samples must be tested by the use of one same type of reaction vessel.

Referential Example 1

(Measuring Example)

Measurement of sample added system—This measurement was performed by using a test tube having a diameter of 25 mm (inside diameter 23 mm). In the test tube, 6.50 ml of distilled water and 1.00 ml of an aqueous sample solution (2% in concentration) were placed and 1.00 ml of KOH (50 w/v in concentration) and a metal indicator NN were added. The absorbance (470 nm in wavelength) with NN under the ensuant condition was set at 0.200±0.03. Since the amount of NN of 100 dilutions added was 7.0 mg, the concentration of NN was estimated to be 18.9 μM. The measurement of the absorbance was continued while adding an aqueous calcium chloride solution at intervals of 30 seconds. At first, an aqueous 5 mM calcium chloride solution was added consecutively at an increment of 0.020 ml until a total of 0.16 ml and further an aqueous 25 mM calcium chloride solution was added first in an amount of 0.15 ml and then in an amount of 0.05 ml. Normally, the ratio of coloration in this state would be substantially 100%. For the sake of precaution, an aqueous 25 mM calcium chloride solution was added in an amount of 0.05 ml to confirm absence of any further increase in absorbance. The data of measurement consequently obtained were analyzed by the method described in the paragraph covering the metal ion bonding force.

Measurement of the control system—This measurement was performed by following the procedure used in the measurement of the sample added system while using distilled water in place of the aqueous sample solution.

Method for Evaluation of Corrosion Inhibiting Ability

The evaluation of the corrosion inhibiting ability was performed by an electrochemical method. The test for corrosion was performed by the use of a cylindrical iron electrode, 9.5 mm (Table 2) and 9.4 mm (Table 3) in diameter and 12.1 mm in length, with the surface polished to a substantially specular surface. The measuring cell was composed of the iron electrode, two graphite electrodes disposed around the iron electrode as counter electrodes, and a saturated calomel electrode (SCE) as a reference electrode. An electrolyte, 900 ml in volume, was used. The composition of the electrolyte was as shown in Table 1.

TABLE 1

Table of compositions of electrolytes used

| Components | Electrolyte A (mM) | Electrolyte B (mM) |
|---|---|---|
| $Na^+$ | 822.5 | 812.5 |
| $K^+$ | 12.78 | 12.94 |
| $Mg^{2+}$ | 10.29 | 10.42 |
| $Ca^{2+}$ | 33.66 | 34.08 |
| $Sr^{2+}$ | 1.39 | 1.41 |
| $Ba^{2+}$ | 3.20 | 3.24 |
| $Cl^-$ | 932.4 | 923.7 |
| $HCO^{3-}$ | 20 | — |

The electrolyte A used for testing corrosion was prepared by passing nitrogen gas through the electrolyte B held in the measuring cell and then adding sodium hydrogen carbonate and hydrochloric acid thereto. Though the electrolyte A had a pH5.9, it enjoyed high pH stability because it constituted a carbonic acid-hydrogen carbonate buffer. The electrolyte A was not aerated for the purpose of preventing diffusion of carbon dioxide. The control measurement of sample concentration 0 was performed with the electrolyte A and then the sample for the measurement was added and tested for its effect. The sample for the measurement was an aqueous 2% solution. It was used in an amount of 0.900 ml when the concentration was 20 ppm. When the sample was added to the measuring system, the system was stirred to homogenize the electrolyte. Normally, no stirring was made.

Calculation of Corrosion Inhibiting Ability

The speed of corrosion is in inverse proportion to Faraday resistance (polarizing resistance). In this invention, the corrosion inhibiting ability was rated by measuring Faraday resistance. The measurement was effected by a method of determining the magnitude of resistance by sweeping a DC applied voltage. in the approximate range of ±10–±12 mV at the open voltage of the iron electrode—SCE. The corrosion inhibiting ability is found in accordance with the equation (5) using the corrosion speed ($V_{cont}$) before the addition of the corrosion inhibitor and the corrosion speed ($V_{sample}$) after the addition of the corrosion inhibitor.

Corrosion inhibiting ability=$(V_{cont}-V_{sample})/V_{cont}$ (equation 5)

The corrosion current is in direct proportion to the corrosion speed and the value of resistance ($R_p$) is in inverse proportion to the corrosion current ($I_{cr}$).

Since ($I_{cr}=K/R_p$) is established, the corrosion inhibiting ability can be found by measuring $R_p$:

Corrosion inhibiting ability=$(R_{p\ sample}-R_{p\ cont})/R_{p\ sample}$ (equation 6)

wherein $R_{p\ cont}$ represents $R_p$ (Ω) before the addition of the corrosion inhibiting agent and $R_{p\ sample}$ represents $R_p$ (Ω) after the addition of the corrosion inhibiting agent. In the case of iron, though the proportional coefficient K seems to be empirically set often at 25 mV or 26 mV, it does not matter in the calculation of the corrosion inhibiting ability because the K value is cancelled. In the examples and comparative examples of this invention, the corrosion inhibiting abilities were obtained by multiplying the numerical values of the equation (6) by 100 and expressing the products in the denomination of percent.

Ammonium Hydrogen Maleate

The ammonium hydrogen maleate used in the examples was prepared by the reaction of maleic acid with ammonia (water) of a theoretical amount.

The weight average molecular weights for the modified polyaspartic acids below are determined by means of a gel-filtration chromatography.

Example I-1

Cysteamine Modified Polyaspartic Acid

Preparation—In a separable flask having an inner volume of 500 ml, 10.65 g (80 mmoles) of ammonium hydrogen maleate was placed and heated by the use of an oil bath at 160° C. as kept stirred meanwhile under a current of argon. After the content of the flask melted, it was left reacting for 30 minutes. The resultant reaction mixture kept stirred and 454 mg (4.0 mmoles) of cysteamine hydrochloride added meanwhile thereto were together stirred thoroughly for two minutes. The produced mixture and 212 mg (2.0 mmoles) of sodium carbonate subsequently added thereto were left reacting.

As the reaction advanced, the reaction mixture solidified to the extent of rendering further stirring impossible. The reaction was stopped five hours after the start of heating and then the reaction mixture was cooled. Consequently, 9.06 g of a solid product (theoretically containing 0.23 g of sodium chloride) was obtained.

A portion, 1.026 g in weight (theoretically containing 0.026 g of sodium chloride), of the solid product was made to form 6.3 g of an aqueous solution by the addition of 2.40 g of an aqueous 10% sodium hydroxide solution and water. A cysteamine modified polyaspartic acid (sodium salt) sample had a concentration of 19.7%.

Measurement—The weight average molecular weight of the modified polyaspartic acid in sodium phosphate buffered saline, pH 7.0, was 5300. The corrosion inhibiting ability was measured by the method of measurement described above. The results are shown in Table 2.

Example I-2

Cysteamine Modified Polyaspartic Acid

Preparation—In a separable flask having an inner volume of 500 ml, 10.65 g (80 mmoles) of ammonium hydrogen maleate was placed and heated by the use of an oil bath at 160° C. as kept stirred meanwhile under a current of argon. After the content of the flask melted, it was left reacting for 30 minutes. The resultant reaction mixture kept stirred and 909 mg (8.0 mmoles) of cysteamine hydrochloride added were together stirred thoroughly for two minutes. The produced mixture and 424 mg (4.0 mmoles) of sodium carbonate subsequently added were left reacting.

As the reaction advanced, the reaction mixture solidified to the extent of rendering further stirring impossible. The reaction was stopped five hours after the start of heating and then the reaction mixture was cooled. Consequently, 9.41 g of a solid product (theoretically containing 0.47 g of sodium chloride) was obtained.

A portion, 1.053 g in weight, of the solid product was made to form a cysteamine modified polyaspartic acid (sodium salt) by the reaction with an aqueous 10% sodium hydroxide solution.

Measurement—The weight average molecular weight of the modified polyaspartic acid in sodium phosphate buffered saline, pH 7.0, was 5300. The corrosion inhibiting ability and the scale inhibiting ability were measured by the methods of measurement described above. The results are shown in Table 3.

Example I-3

Cysteamine Modified Polyaspartic Acid

Preparation—In a separable flask having an inner volume of 500 ml, 10.65 g (80 mmoles) of ammonium hydrogen maleate was placed and heated by the use of an oil bath at 160° C. as kept stirred meanwhile under a current of argon. After the content of the flask melted, it was left reacting for 30 minutes. The resultant reaction mixture kept stirred and 1818 mg (16 mmoles) of cysteamine hydrochloride added were together stirred thoroughly for one minute. The produced mixture and 848 mg (8.0 mmoles) of sodium carbonate subsequently added were left reacting.

As the reaction advanced, the reaction mixture solidified to the extent of rendering further stirring impossible. The reaction was stopped five hours after the start of heating and then the reaction mixture was cooled. Consequently, 10.52 g of a solid product (theoretically containing 0.94 g of sodium chloride) was obtained.

A portion, 1.102 g in weight, of the solid product was made to form a cysteamine modified polyaspartic acid (sodium salt) by the reaction with an aqueous 10% sodium hydroxide solution.

Measurement—The weight average molecular weight of the modified polyaspartic acid in sodium phosphate buffered saline, pH 7.0, was 6000. The corrosion inhibiting ability was measured by the method of measurement described above. The results are shown in Table 2.

Example I-4
Cysteamine Modified Polyaspartic Acid

Preparation—In a separable flask having an inner volume of 500 ml, 10.65 g (80 mmoles) of ammonium hydrogen maleate was placed and heated by the use of an oil bath at 160° C. as kept stirred meanwhile under a current of argon. After the content of the flask melted, it was left reacting for 30 minutes. The resultant reaction mixture kept stirred and 1818 mg (16 mmoles) of cysteamine hydrochloride added were together stirred thoroughly for one minute. The produced mixture and 801 mg (8.0 mmoles) of calcium carbonate subsequently added thereto were left reacting.

As the reaction advanced, the reaction mixture solidified to the extent of rendering further stirring impossible. The reaction was stopped five hours after the start of heating and the reaction mixture was cooled. Consequently, 10.61 g of a solid product (theoretically containing 0.89 g of calcium chloride) was obtained.

A portion, 0.546 g in weight, of the solid product was made to form a cysteamine modified polyaspartic acid by the reaction with an aqueous 10% sodium hydroxide solution. When the cysteamine modified polyaspartic acid thus obtained was tested for corrosion inhibiting ability, the concentration was treated on the assumption that the acid had been converted into a sodium salt.

Measurement—The corrosion inhibiting ability was measured by the above measurement method. The results are shown in Table 2.

Example I-5
Cysteamine Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 3636 mg (32 mmoles) of cysteamine hydrochloride added were together stirred thoroughly for one minute. The produced mixture and 1696 mg (16 mmoles) of sodium carbonate subsequently added were left reacting.

As the reaction advanced, the reaction mixture solidified to the extent of rendering further stirring impossible. The reaction was stopped five hours after the start of heating and then the reaction mixture was cooled. Consequently, 12.93 g of a solid product (theoretically containing 1.87 g of sodium chloride) was obtained.

A portion, 1.169 g in weight, of the solid product was made to form a cysteamine modified polyaspartic acid (sodium salt) by the reaction with an aqueous 10% sodium hydroxide solution.

Measurement—The weight average molecular weight of the modified polyaspartic acid in sodium phosphate buffered saline, pH 7.0, was 4600. The corrosion inhibiting ability was measured by the above measurement method. The results are shown in Table 2.

Example I-6
Cysteamine Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 454 mg (4.0 mmoles) of cysteamine hydrochloride added were together stirred to induce a reaction.

As the reaction advanced, the reaction mixture solidified to the extent of rendering further stirring impossible. The reaction was stopped five hours after the start of heating and then the reaction mixture was cooled. Consequently, 8.70 g of a solid product was obtained.

The solid product was made to form a cysteamine modified polyaspartic acid (sodium salt) by the addition of water and an aqueous 10% sodium hydroxide solution.

Measurement—The weight average molecular weight of the modified polyaspartic acid in sodium phosphate buffered saline, pH 7.0, was 4800. The cysteamine modified polyaspartic acid (sodium salt) was tested for corrosion inhibiting ability by the above measurement method. The results are shown in Table 2.

Example I-7
Cysteamine Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 909 mg (8.0 mmoles) of cysteamine hydrochloride added were together stirred to induce a reaction.

As the reaction advanced, the reaction mixture solidified to the extent of rendering further stirring impossible. The reaction was stopped five hours after the start of heating and then the reaction mixture was cooled. Consequently, 9.07 g of a solid product was obtained.

The solid product was made to form a cysteamine modified polyaspartic acid (sodium salt) by the addition of water and an aqueous 10% sodium hydroxide solution.

Measurement—The weight average molecular weight of the modified polyaspartic acid in sodium phosphate buffered saline, pH 7.0, was 5500. The cysteamine modified polyaspartic acid (sodium salt) was tested for corrosion inhibiting ability by the above measurement method. The results are shown in Table 2.

Example I-8
Cysteamine Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 1818 mg (16 mmoles) of cysteamine hydrochloride added were together stirred to induce a reaction.

As the reaction advanced, the reaction mixture solidified to the extent of rendering further stirring impossible. The reaction was stopped five hours after the start of heating and then the reaction mixture was cooled. Consequently, 9.84 g of a solid product was obtained.

The solid product was made to form a cysteamine modified polyaspartic acid (sodium salt) by the addition of water and an aqueous 10% sodium hydroxide solution.

Measurement—The weight average molecular weight of the modified polyaspartic acid in sodium phosphate buffered saline, pH 7.0, was 5900. The cysteamine modified polyaspartic acid (sodium salt) was tested for corrosion inhibiting ability by the above measurement method. The results are shown in Table 2.

Example I-9
Cysteamine Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 3636 mg (32 mmoles) of cysteamine hydrochloride added were together stirred to induce a reaction.

As the reaction advanced, the reaction mixture solidified to the extent of rendering further stirring impossible. The reaction was stopped five hours after the start of heating and then the reaction mixture was cooled. Consequently, 11.49 g of a solid product was obtained.

The solid product was made to form a cysteamine modified polyaspartic acid (sodium salt) by the addition of water and an aqueous 10% sodium hydroxide solution.

Measurement—The weight average molecular weight of the modified polyaspartic acid in sodium phosphate buffered saline, pH 7.0, was 4200. The cysteamine modified polyaspartic acid (sodium salt) was tested for corrosion inhibiting ability by the above measurement method. The results are shown in Table 2.

Example I-10
o-Aminobenzenethiol Modified Polyaspartic Acid

Preparation—In a separable flask having an inner volume of 500 ml, 10.65 g (80 mmoles) of ammonium hydrogen maleate was placed and heated by using an oil bath at 160° C. while stirring under a current of argon. After the content of the flask melted, it was left reacting for 30 minutes. The resultant reaction mixture kept stirred and 1002 mg (8 mmoles) of o-aminobenzenethiol added meanwhile thereto were together stirred to induce a reaction.

As the reaction advanced, the reaction mixture solidified to the extent of rendering further stirring impossible. The reaction was stopped five hours after the start of heating and the reaction mixture was cooled. Consequently, 9.13 g of a solid product was obtained.

The solid product was made to form an o-aminobenzenethiol modified polyaspartic acid (sodium salt) by the addition of water and an aqueous 10% sodium hydroxide solution.

Measurement—The weight average molecular weight of the modified polyaspartic acid in sodium phosphate buffered saline, pH 7.0, was 5000. The o-aminobenzenethiol modified polyaspartic acid (sodium salt) was tested for corrosion inhibiting ability by the above measurement method. The results are shown in Table 2.

Comparative Example I

Sodium polyaspartate CF-110 and laurylamine were tested for corrosion inhibiting ability in the same manner as the modified polyaspartic acid. The results are shown in Table 2.

TABLE 2

| Example I - type | *Molar ratio of cysteamine | 0 Rp ($\Omega$) | Sample concentration (ppm) | | | |
|---|---|---|---|---|---|---|
| | | | 3 | | 20 | |
| | | | Rp ($\Omega$) | Corrosion inhibiting ability (%) | Rp ($\Omega$) | Corrosion inhibiting ability (%) |
| Example 1 | 5 | 72 | 369 | 80.4 | 4650 | 98.5 |
| Example 2 | 10 | 83 | 402 | 79.4 | 10410 | 99.2 |
| Example 3 | 20 | 92 | 1527 | 94.0 | 12860 | 99.3 |
| Example 4 | 20 | 87 | | | 9260 | 99.1 |
| Example 5 | 40 | 84 | | | 20980 | 99.6 |
| Example 6 | 5 | 89 | | | 9100 | 99.0 |
| Example 7 | 10 | 80 | | | 10990 | 99.3 |
| Example 8 | 20 | 95 | | | 18340 | 99.5 |
| Example 9 | 40 | 86 | | | 12030 | 99.3 |
| Example 10 | 10** | 97 | | | 4120 | 97.6 |
| C. Ex. I | | | | | | |
| CF-110 | 0 | 72.4 | 148.5 | 51.3 | 184 | 60.6 |
| Lauryl-amine | — | 83.5 | 94.1 | 11.3 | 177 | 52.8 |

*Molar ratio of cysteamine to aspartic acid residue (100)
**Molar ratio of o-aminobenzenethiol to aspartic acid residue (100)
C. Ex.: Comparative Example Explanation of Table 2: The corrosion inhibiting effect of the o-aminobenzenethiol modified polyaspartic acid of an example of this invention, based on CF-110, was about 22 at a sample concentration of 20 ppm. The corrosion inhibiting effect of the cysteamine modified polyaspartic acid of an example of this invention, based on CF-110, was 25–110 at a sample concentration of 20 ppm. The corrosion inhibiting ability was particularly high in Example I-5.

From the results, it is inferred that the corrosion inhibiting ability of the modified polyaspartic acid of this invention was superior to that of the conventional polyaspartic acid. The cysteamine modified polyaspartic acid showed superior inhibiting ability approximately 25–110 tiems as excellent as the conventional sodium polyaspartate, CF-110.

Example II-1
Cysteamine Aspartic Acid Modified Polyaspartic Acid

In a separable flask having an inner volume of 500 ml, 10.65 g (80 mmoles) of ammonium hydrogen maleate was placed and heated by using an oil bath at 160° C. while stirring under a current of argon. The content of the flask was melted in 65 minutes and then was left reacting for 25 minutes. The resultant reaction mixture kept stirred and a mixture of 2.57 g (equivalent to 0.46 hydrous salt, 10.67 mmoles) sodium cysteamine aspartate and 2.56 g (equivalent to 0.26 hydrous salt, 16.0 mmoles) of sodium hydrogen aspartate added meanwhile as a modifying agent were vigorously mixed to induce a reaction. As the reaction advanced, the reaction mixture solidified to the extent of rendering further stirring difficult. The reaction was stopped 25 minutes after the modifying agent was added and then the reaction mixture was cooled. Consequently, 13.63 g of a solid product was obtained.

The solid product was made to form a modified polyaspartic acid (sodium salt) by the addition of water and an aqueous 10% sodium hydroxide solution. The metal ion bonding force was measured and analyzed by the use of an Oda plot, with a metal indicator NN and Ca ion as a probe. The scale inhibiting ability (ability to prevent formation of precipitate of calcium carbonate) and the metal corrosion inhibiting ability were measured by the methods described above. The results are shown in Table 3.

Since the molecular weights determined by means of a gel-filtration chromatography show variation depending on the conditions of analysis, the weight average molecular weight of the modified polyaspartic acid in this example is estimated as 7200 from the weight average molecular weight, 5300, of the corresponding unmodified polyaspartic acid.

Example II-2
Cysteamine Aspartic Acid Modified Polyaspartic Acid

In a separable flask having an inner volume of 500 ml, 10.65 g (80 mmoles) of ammonium hydrogen maleate was placed and heated by using an oil bath at 160° C. while stirring under a current of argon. The content of the flask was melted in 65 minutes and then left reacting for 25 minutes. The resultant reaction mixture kept stirred and a mixture of 2.57 g (equivalent to 0.46 hydrous salt, 10.67 mmoles) sodium cysteamine aspartate and 2.40 g (anhydrous salt, 16.0 mmoles) of ammonium hydrogen aspartate added meanwhile as a modifying agent were vigorously mixed to induce a reaction. As the reaction advanced, the reaction mixture solidified to the extent of rendering further stirring difficult. The reaction was stopped 25 minutes after the modifying agent was added and then the reaction mixture was cooled. Consequently, 13.55 g of a solid product was obtained.

The solid product was made to form a modified polyaspartic acid (sodium salt) by the addition of water and an aqueous 10% sodium hydroxide solution. The metal ion bonding force was measured and analyzed by the use of an Oda plot, with a metal indicator NN and Ca ion as a probe. The scale inhibiting ability (ability to prevent formation of precipitate of calcium carbonate) and the metal corrosion inhibiting ability were measured by the methods described above. The results are shown in Table 3.

Example II-3
Cysteamine Aspartic Acid Modified Polyaspartic Acid

In a separable flask having an inner volume of 500 ml, 10.65 g (80 mmoles) of ammonium hydrogen maleate was placed and heated by using an oil bath at 160° C. while stirring under a current of argon. The content of the flask melted in 65 minutes and then was left reacting for 25 minutes. The resultant reaction mixture kept stirred and a mixture of 2.57 g (equivalent to 0.46 hydrous salt, 10.67 mmoles) sodium cysteamine aspartate and 3.11 g (equivalent to 2.79 anhydrous salt, 8.0 mmoles) of magnesium hydrogen aspartate added meanwhile as a modifying agent were vigorously mixed to induce a reaction. As the reaction advanced, the reaction mixture solidified to the extent of rendering further stirring difficult. The reaction was stopped 25 minutes after the addition of the modifying agent was added and then the reaction mixture was cooled. Consequently, 13.68 g of a solid product was obtained.

The solid product was made to form a modified polyaspartic acid (sodium salt) by the addition of water and an aqueous 10% sodium hydroxide solution. The scale inhibiting ability (ability to prevent formation of precipitate of calcium carbonate) and the metal corrosion inhibiting ability were measured by the methods described above. The results are shown in Table 3.

Example II-4
Cysteamine Aspartic Acid Modified Polyaspartic Acid

In a separable flask having an inner volume of 500 ml, 10.65 g (80 mmoles) of ammonium hydrogen maleate was placed and heated by using an oil bath at 160° C. while stirring under a current of argon. After the content of the flask was melted, it was left reacting for 30 minutes. The resultant reaction mixture kept stirred and 2.67 g (equivalent to 5.6 anhydrous salt, 8.0 mmoles) of sodium cysteamine aspartate added meanwhile were vigorously mixed to induce a reaction. As the reaction advanced, the reaction mixture solidified to the extent of rendering further stirring difficult. The reaction was stopped about 300 minutes after the start of heating (240 minutes of reaction time after the addition of sodium cysteamine aspartat) and the then reaction mixture was cooled. Consequently, 10.72 g of a solid product was obtained.

The solid product was made to form a modified polyaspartic acid (sodium salt) by the addition of water and an aqueous 10% sodium hydroxide solution. The metal corrosion inhibiting ability was measured by the methods described above. The results are shown in Table 3.

Example II-5
Cysteamine Aspartic Acid Modified Polyaspartic Acid

In a separable flask having an inner volume of 500 ml, 10.65 g (80 mmoles) of ammonium hydrogen maleate was placed and heated by using an oil bath at 160° C. while stirring under a current of argon. After the content of the flask was melted, it was left reacting for 30 minutes. The resultant reaction mixture kept stirred and 5.33 g (equivalent to 5.6 anhydrous salt, 16.0 mmoles) of sodium cysteamine aspartate added meanwhile were vigorously mixed to induce a reaction. As the reaction advanced, the reaction mixture solidified to the extent of rendering further stirring difficult. The reaction was stopped about 300 minutes after the start of heating (240 minutes of reaction time after the addition of sodium cysteamine aspartate) and the reaction mixture was cooled. Consequently, 13.2 g of a solid product was obtained.

The solid product was made to form a modified polyaspartic acid (sodium salt) by the addition of water and an aqueous 10% sodium hydroxide solution. The metal corrosion inhibiting ability was measured by the methods described above. The results are shown in Table 3.

Comparative Example II

A polyaspartic acid (sodium salt) CF-110 was tested and analyzed for metal ion bonding force by the use of an Oda plot, with a metal indicator NN and a Ca ion as a probe. The scale inhibiting ability (ability to prevent formation of precipitate of calcium carbonate) was measured by the method described above. The results are shown in Table 3.

TABLE 3.

Results of measurement of metal ion bonding force

| Name of sample (Example II Type | The metal ion bonding force ($M^{-1}$) | The scale inhibiting ability (%) | The metal corrosion inhibiting ability (%) |
| --- | --- | --- | --- |
| Example 1 | 59 | 64 | 99.6 |
| Example 2 | 45 | 63 | 99.5 |
| Example 3 |  | 66 | 99.5 |
| Example 4 |  |  | 99.7 |
| Example 5 |  |  | 99.6 |
| C.Ex.II (CF-110) | 17 | 37 | 61 |
| Example I-2 | 21 | 33 | 99.2 |

C. Ex.: Comparative Example

While the embodiments or examples of the present invention, as herein disclosed, constitute a preferred form, it is to be understood that other form might be adopted.

The entire disclosure of Japanese Patent Application No. 10-226334 filed on Aug. 10, 1998 including specification, claims, drawing and summary are incorporated herein by reference in its entirety.

What is claimed is:

1. A modified polyaspartic acid comprising a partial structure represented by the formula I:

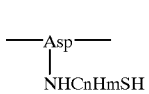

(I)

at a molar ratio (I) in the range of not less than 1 to not more than 99 and at least one branched chain structure selected from the group consisting of the formulas II and III at a molar ratio (I) of not less than 1 to not more than 49:

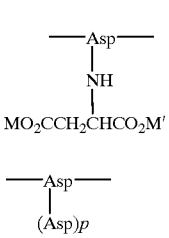

wherein the term "molar ratio (I)" used herein means the ratio based on the number of moles (100) of a total aspartic residue of a polyaspartic acid, and Asp denotes an aspartic residue, n an integer of not less than 1 to not more than 25, and m an integer of not less than 2 to not more than 2n, M and M' independently denote a hydrogen atom, an ammonium, or a metal, and (Asp)p denotes a branched chain.

2. An acid according to claim 1, wherein a weight average molecular weight of the modified polyaspartic acid is in the range of 1500 to $2 \times 10^6$.

3. An acid according to claim 1, wherein said partial structure is

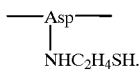

4. An acid according to claim 1, wherein the calcium ion bonding force based on the molar concentration of a carboxyl group at 25° C. is not less than 17 $M^{-1}$ and not more than 220 $M^{-1}$.

5. An acid according to claim 1, wherein the molar ratio of the partial structure to the branched chain structure is in the range of 98 to 2:1 to 49.

6. A method for producing a modified polyaspartic acid, which method comprises
adding at least one member selected from the group consising of a mercapto amine precursor, mercapto amine, and a salt of mercapto amine to an anhydro polyaspartic acid and
allowing them to react,
wherein the term "mercapto amine" means $HSCnHmNH_2$, n denotes an integer of not less than 1 and not more than 25 and m denotes an integer of not less than 2 and not more than 2n.

7. A method according to claim 6, wherein the reaction is carried out in the absence of a solvent.

8. A method according to claim 6, wherein the reaction is effected at in a temperature of 100 to 180° C.

9. A method according to claim 6, further adding a basic substance together with the member selected from the group consisting of a mercapto amine precursor, mercapto amine, and a salt of mercapto amine.

10. A method according to claim 6, wherein the mercapto amine precursor is at least one selected from the group consisting of thiazolidine, methylthiazolidine and dimethylthiazolidine.

11. A method according to claim 6, wherein the mercapto amine is at least one selected from the group consisting of cysteamine and o-aminobenzene thiol.

12. A method according to claim 6, wherein the salt of mercapto amine is at least one selected from the group consisting of cysteamine hydrochloride, sodium cysteamine aspartate and cysteamine hydrogen aspartate.

13. A method according to claim 6, wherein the member is the salt of mercapto amine.

14. A method according to claim 6, wherein said anhydro polyaspartic acid is obtained by heating and melting ammonium hydrogen maleate.

15. A method according to claim 6, wherein a salt of aspartic acid or aspartic acid is further added in conjunction with the member.

16. A method according to claim 15, wherein the salt of aspartic acid is at least one selected from the group consisting of sodium hydrogen aspartate, ammonium hydrogen aspartate, potassium hydrogen aspartate, calcium hydrogen aspartate, and magnesium hydrogen aspartate.

17. A method according to claim 15, wherein the salt of aspartic acid or aspartic acid is the salt of aspartic acid.

18. A method according to claim 6, wherein a total of not less than 1 and not more than 99 molar ratio (II) of said mercapto amine precursor, mercapto amine, or salt of mercapto amine to react with said anhydro polyaspartic acid, wherein the expression "molar ratio (II)" means the ratio based (100) of the number of moles of total aspartic acid residue of anhydro polyaspartic acid, the term "mercapto amine" means $HSCnHmNH_2$, and n represents an integer of not less than 1 and not more than 25, and m represents an integer of not less than 2 and not more than 2n.

19. A method according to claim 15, wherein a total of not less than 2 and not more than 99 molar ratio (II) of the salt of aspartic acid or aspartic acid to react with said anhydro polyaspartic acid, wherein the expression "molar ratio (II)" means the ratio based (100) of the number of moles of total aspartic acid residue of anhydro polyaspartic acid.

20. A method of inhibiting metal corrosion, comprising contacting a modified polyaspartic acid as set forth in claim 1 with a metal, corrosion of which is to be inihibited.

21. A method of inhibiting scale formation, comprising contacting a modified polyaspartic acid as set forth in claim 1 with an object, scale formation from which is to be inhibited.

* * * * *